US011809265B1

(12) United States Patent
Dimitrov et al.

(10) Patent No.: US 11,809,265 B1
(45) Date of Patent: Nov. 7, 2023

(54) METHODS AND APPARATUS TO MANAGE RESOURCES WHEN PERFORMING AN ACCOUNT HEALTH CHECK

(71) Applicant: VMware, Inc., Palo Alto, CA (US)

(72) Inventors: George P. Dimitrov, Sofia (BG); Ivan Nushev, Sofia (BG); Dimitar Chobanov, Sofia (BG)

(73) Assignee: VMware, Inc., Palo Alto, CA (US)

(*) Notice: Subject to any disclaimer, the term of this patent is extended or adjusted under 35 U.S.C. 154(b) by 0 days.

(21) Appl. No.: 17/870,579

(22) Filed: Jul. 21, 2022

(51) Int. Cl.
*G06F 11/00* (2006.01)
*G06F 11/07* (2006.01)
*G06F 9/50* (2006.01)

(52) U.S. Cl.
CPC ........ *G06F 11/0754* (2013.01); *G06F 9/5072* (2013.01)

(58) Field of Classification Search
CPC ............. G06F 11/0754; G06F 11/0757; G06F 11/076; G06F 11/0793; G06F 11/3055; H04L 67/1396; H04L 67/143; H04L 67/54; H04L 43/0805; H04L 43/0811; H04L 43/10; H04L 43/103; H04L 41/5058
See application file for complete search history.

(56) References Cited

U.S. PATENT DOCUMENTS

| | | | | |
|---|---|---|---|---|
| 2007/0192652 A1* | 8/2007 | Kao | ..................... | H04L 63/0492 714/E11.003 |
| 2016/0308748 A1* | 10/2016 | Zuo | ........................ | H04W 24/04 |
| 2020/0186455 A1* | 6/2020 | Lokhandwala | ....... | H04L 43/103 |
| 2021/0349794 A1* | 11/2021 | Gavrilov | ............. | G06F 11/1441 |
| 2022/0365834 A1* | 11/2022 | Chen | ................... | G06F 11/0778 |

* cited by examiner

*Primary Examiner* — Marc Duncan

(74) *Attorney, Agent, or Firm* — HANLEY, FLIGHT & ZIMMERMAN LLC

(57) ABSTRACT

Methods, apparatus, systems, and articles of manufacture to manage resources when performing an account health check are disclosed. An example apparatus includes memory; computer readable instructions; and processor circuitry to execute the computer readable instructions to: perform health checks on a cloud account at a first polling frequency; after a failure count at the first polling frequency meets a first threshold, perform the health checks on the cloud account at a second polling frequency lower than the first polling frequency; and after the failure count at the second polling frequency meets a second threshold, suspend the cloud account.

21 Claims, 10 Drawing Sheets

US 11,809,265 B1

METHODS AND APPARATUS TO MANAGE RESOURCES WHEN PERFORMING AN ACCOUNT HEALTH CHECK

FIELD OF THE DISCLOSURE

This disclosure relates generally to computing environments, and, more particularly, to methods and apparatus to manage resources when performing an account health check.

BACKGROUND

Computing environments often include many virtual and physical computing resources. For example, software-defined data centers (SDDCs) are data center facilities in which many or all elements of a computing infrastructure (e.g., networking, storage, CPU, etc.) are virtualized and delivered as a service. The computing environments often include management resources for facilitating management of the computing environments and the computing resources included in the computing environments. Some of these management resources include the capability to automatically monitor computing resources and generate alerts when compute issues are identified. Additionally or alternatively, the management resources may be configured to provide recommendations for responding to generated alerts. In such examples, the management resources may identify computing resources experiencing issues and/or malfunctions and may identify methods or approaches for remediating the issues. Recommendations may provide an end user(s) (e.g., an administrator of the computing environment) with a list of instructions or a series of steps that the end user(s) can manually perform on a computing resource(s) to resolve the issue(s). Although the management resources may provide recommendations, the end user(s) is responsible for implementing suggested changes and/or performing suggested methods to resolve the compute issues.

DETAILED DESCRIPTION

Figure 1:
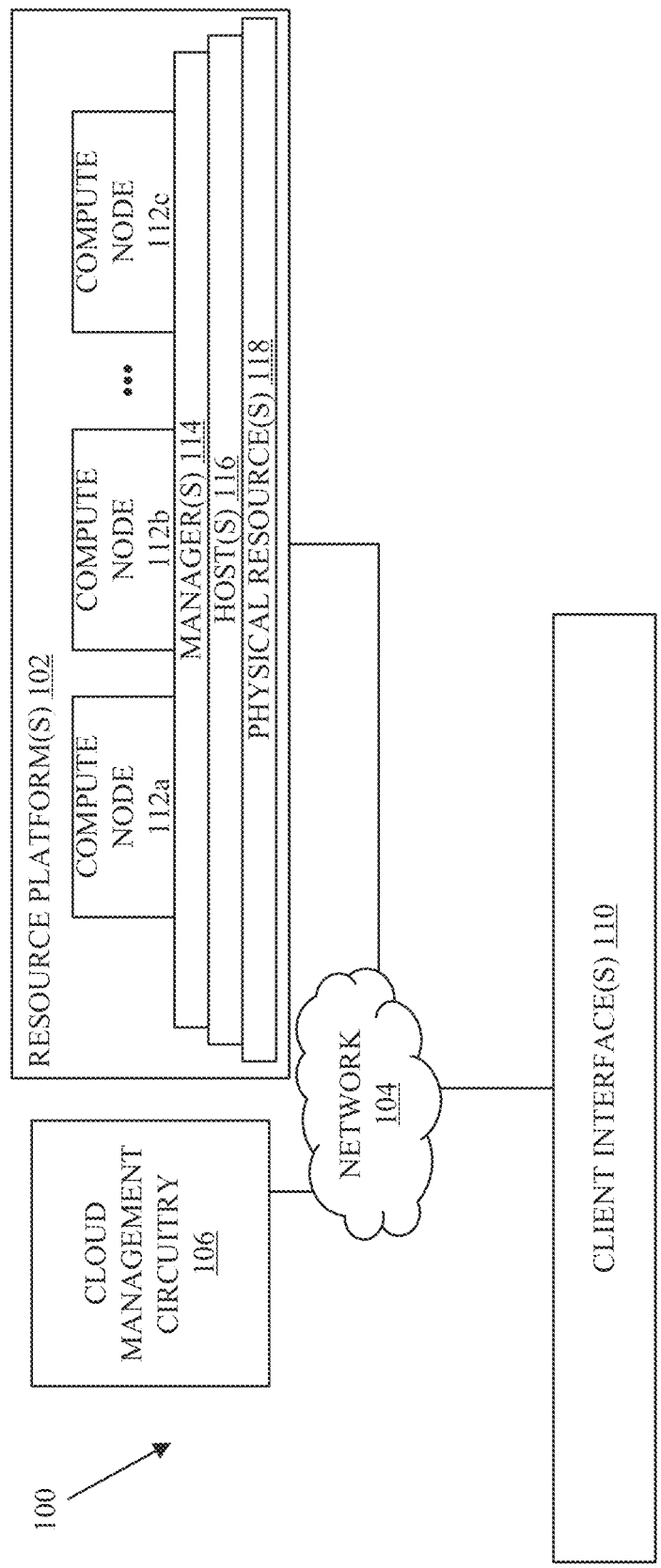
FIG. 1 is a block diagram of an example environment in which an example cloud management circuitry is configured to perform examples disclosed herein.

The figures are not to scale. Instead, the thickness of the layers or regions may be enlarged in the drawings. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

Virtual computing services enable one or more assets to be hosted within a computing environment. As disclosed herein, an asset is a computing resource (physical or virtual) that may host a wide variety of different applications such as, for example, an email server, a database server, a file server, a web server, etc. Example assets include physical hosts (e.g., non-virtual computing resources such as servers, processors, computers, etc.), virtual machines, containers that run on top of a host operating system without the need for a hypervisor or separate operating system, hypervisor kernel network interface modules, etc. In some examples, an asset may be referred to as a compute node, an end-point, a data computer end-node or as an addressable node.

Virtual machines operate with their own guest operating system on a host using resources of the host virtualized by virtualization software (e.g., a hypervisor, virtual machine monitor, etc.). Numerous virtual machines can run on a single computer or processor system in a logically separated environment (e.g., separated from one another). A virtual machine can execute instances of applications and/or programs separate from application and/or program instances executed by other virtual machines on the same computer.

Management applications (e.g., cloud management such as vRealize® Automation Cloud Assembly) provide administrators visibility into the condition of assets in a computing environment (e.g., a data center). Administrators can inspect the assets, see the organizational relationships of a virtual application, filter log files, overlay events versus time, etc. In some examples, an application may install one or more plugins (sometimes referred to herein as "agents") at the asset to perform monitoring operations. For example, a first management application may install a first monitoring agent at an asset to track an inventory of physical resources and logical resources in a computing environment, a second management application may install a second monitoring agent at the asset to provide real-time log management of events, analytics, etc., and a third management application may install a third monitoring agent to provide operational views of trends, thresholds and/or analytics of the asset, etc. However, executing the different monitoring agents at the asset consumes resources (e.g., physical resources) allocated to the asset. In addition, some monitoring agents may perform one or more similar task(s).

In some systems (e.g., such as vRealize® Automation), a user and/or administrator may set up and/or create a cloud account (e.g., a Google® cloud platform (GCP) account, a network security virtualization platform (NSX) account, a VMware® cloud foundation (VCF) account, a vSphere® account, etc.) to connect a cloud provider and/or a private cloud so that the management applications can collect data from regions of datacenters. Additionally, cloud accounts allow a user and/or administrator to deploy and/or provision cloud templates to the regions. A cloud template is a file that defines a set of resources. The cloud template may utilize tools to create server builds that can become standards for cloud applications. A user and/or administrator can create cloud accounts for projects in which other users (e.g., team members) work. The management applications periodically perform health checks on the cloud accounts to verify that the accounts are healthy (e.g., the credentials are valid, the connectivity is acceptable, the account is accessible, etc.). During a health check, the management application may attempt to access the cloud account. If the account cannot be accessed, the health test fails and a threshold number of retries are performed until a timeout occurs. However, management applications may monitor thousands of accounts, which causes a health check to use significant time and resources to perform (e.g., upwards of three minutes), thereby taking away resources from other tasks). For example, some management applications perform health checks every 10-15 minutes with each health checking taking up to 3-5 minutes when multiple accounts are unhealthy, thus 20-50% of the time resources of the management applications is dedicated to health checks and cannot be used for other tasks.

Examples disclosed herein decrease the health check polling frequency and/or suspend cloud accounts after a threshold number of fails. Although some health check failures will resolve themselves within a short duration of time, the longer that an account fails a health check, the less likely it will be that the failure will resolve itself. Accordingly, examples disclosed herein perform less frequent (or no) health checks for accounts that have been failing for a long time, thereby reducing the time and resources to perform a health check. In some examples, cloud accounts may be undergoing maintenance, may have limited connectivity for a short duration of time, may have changed network switches and/or IP addresses which haven't been updated at the cloud account. In such examples, the cloud account will fail a health check for a short period of time, but may pass the health check after the short period of time (e.g., a minute, an hour, etc.). Accordingly, examples disclosed herein will decrease the polling frequency (e.g., from a first frequency of once every 10-15 minutes to a second frequency of once every hour or two hours) from the normal level to a lower level for such cloud accounts. In this manner, the management applications save resources while giving such accounts time to enter back into a healthy state, without suspending the accounts and causing a user and/or administrator to perform subsequent actions.

In some examples, cloud accounts may have invalid and/or outdated credentials that cause a health check to fail. In such examples, the cloud accounts may take need more time to allow the user to update the credentials to return the account back to a healthy status. Accordingly, examples disclosed herein may further reduce the polling frequency (e.g., from the second frequency of once every one or two hours to a third frequency of once every 12 or 24 hours) from the first lower level to a second lower level (e.g., lower than the first lower level) for such cloud accounts. In this manner, the management applications save resources by polling such accounts less often while giving time to such accounts to enter back into a healthy state, without suspending the accounts and causing a user and/or administrator to perform subsequent actions. After a threshold number of failures and/or decreased frequency levels, examples disclosed herein suspends the unhealthy accounts (e.g., stop performing health checks until the suspension is over). By decreasing and/or suspending cloud accounts, examples disclosed herein can perform health checks faster and using less resources, thereby freeing up time and resources to perform other tasks.

FIG. 1 is a block diagram of an example environment 100 in which example could management circuitry 106 is configured to manage cloud accounts corresponding to example resource platform(s) 102. The example environment 100 includes the example resource platform(s) 102, an example network 104, the example cloud management circuitry 106, and example client interface(s) 110. The example resource platform(s) 102 include(s) example compute nodes 112a-c, example manager(s) 114, example host(s) 116, and example physical resource(s) 118. The example computing environment 100 may be a software-defined data center (SDDC). Alternatively, the example computing environment 100 may be any type of computing resource environment such as, for example, any computing system utilizing network, storage, and/or server virtualization.

The example resource platform(s) 102 of FIG. 1 is a collection of computing resources that may be utilized to perform computing operations. The computing resources may include server computers, desktop computers, storage resources and/or network resources. Additionally or alternatively, the computing resources may include devices such as, for example, electrically controllable devices, processor controllable devices, network devices, storage devices, Internet of Things devices, or any device that can be managed by a resource manager. In some examples, the resource platform(s) 102 includes computing resources of a computing environment(s) such as, for example, a cloud computing environment. In other examples, the resource platform(s) 102 may include any combination of software resources and hardware resources. The example resource platform(s) 102 is virtualized and supports integration of virtual computing resources with hardware resources. In some examples, multiple and/or separate resource platforms 102 may be used for development, testing, staging, and/or production. The example resource platform 102 includes example compute nodes 112a-c, an example manager(s) 114, an example host(s) 116, and an example physical resource(s) 118.

The example compute nodes 112a-c are computing resources that may execute operations within the example computing environment 100. The example compute nodes 112a-c are illustrated as virtual computing resources managed by the example manager 114 (e.g., a hypervisor) executing within the example host 116 (e.g., an operating system) on the example physical resources 118. The example computing nodes 112a-c may, alternatively, be any combination of physical and virtual computing resources. For example, the compute nodes 112a-c may be any combination of virtual machines, containers, and physical computing resources.

Virtual machines operate with their own guest operating system on a host (e.g., the example host 116) using resources of the host virtualized by virtualization software (e.g., a hypervisor, virtual machine monitor, etc.) (e.g., the example manager 114). Numerous virtual machines can run on a single computer or processor system in a logically separated environment (e.g., separated from one another). A virtual machine can execute instances of applications and/or programs separate from application and/or program instances executed by other virtual machines on the same computer.

In some examples, containers are virtual constructs that run on top of a host operating system (e.g., the example compute node 112a-c executing within the example host 116) without the need for a hypervisor or a separate guest operating system. Containers can provide multiple execution environments within an operating system. Like virtual machines, containers also logically separate their contents (e.g., applications and/or programs) from one another, and numerous containers can run on a single computer or processor system. In some examples, utilizing containers, a host operating system uses namespaces to isolate containers from each other to provide operating-system level segregation of applications that operate within each of the different containers. For example, the container segregation may be managed by a container manager (e.g., the example manager 114) that executes with the operating system (e.g., the example compute node 112a-c executing on the example host 116). This segregation can be viewed as a form of virtualization that isolates different groups of applications that operate in different containers. In some examples, such containers are more lightweight than virtual machines. In some examples, a container OS may execute as a guest OS in a virtual machine. The example compute nodes 112a-c may host a wide variety of different applications such as, for example, an email server, a database server, a file server, a web server, etc.

The example manager(s) 114 of FIG. 1 manages one or more of the example compute nodes 112a-c. In examples disclosed herein, the example resource platform(s) 102 may include multiple managers 114. In some examples, the example manager (s) 114 is a virtual machine manager (VMM) that instantiates virtualized hardware (e.g., virtualized storage, virtualized memory, virtualized processor(s), etc.) from underlying hardware. In other examples, the example manager(s) 114 is a container engine that enforces isolation within an operating system to isolate containers in which software is executed. As used herein, isolation means that the container engine manages a first container executing instances of applications and/or programs separate from a second (or other) container for hardware.

The example host(s) 116 of FIG. 1 is/are a native operating system(s) (OS) executing on example physical resources 118. The example host(s) 116 manages hardware of a physical machine(s). In examples disclosed herein, the example resource platform(s) 102 may include multiple hosts 116. In the illustrated example of FIG. 1, the example host(s) 116 executes the example manager 114. In some examples, certain ones of the hosts 116 may execute certain ones of the managers 114.

The example physical resource(s) 118 of FIG. 1 is a hardware component of a physical machine(s). In some examples, the physical resource(s) 118 may be a processor, a memory, a storage, a peripheral device, etc. of the physical machine(s). In examples disclosed herein, the example resource platform(s) 102 may include one or more physical resources 118. In the illustrated example of FIG. 1, the example host(s) 116 execute on the physical resource(s) 118.

The example network 104 of FIG. 1 communicatively couples computers and/or computing resources of the example computing environment 100. In the illustrated example of FIG. 1, the example network 104 is a cloud computing network that facilitates access to shared computing resources. In examples disclosed herein, information, computing resources, etc. are exchanged among the example resource platform(s) 102 and the example cloud management circuitry 106 via the example network 104. The example network 104 may be a wired network, a wireless network, a local area network, a wide area network, and/or any combination of networks.

The example cloud management circuitry 106 of the illustrated example of FIG. 1 manages cloud computing environments (e.g., a cloud computing environment provided by the example resource platform(s) 102. In some examples, the example cloud management circuitry 106 automatically allocates and provisions applications and/or computing resources to end users. To that end, the example cloud management circuitry 106 may include a computing resource catalog from which computing resources can be provisioned. The example cloud management circuitry 106 provides deployment environments in which an end user such as, for example, a software developer, can deploy or receive an application(s). In some examples, the example cloud management circuitry 106 may be implemented using a vRealize® Automation system developed and sold by VMware®, Inc. In other examples, any other suitable cloud computing platform may be used to implement the cloud management circuitry 106.

The example cloud management circuitry 106 of FIG. 1 may collect information about, and measures performance related to the example network 104, the example compute nodes 112*a*-*c*, the example manager(s) 114, the example host(s) 116, and/or the example physical resource(s) 118. In some examples, the example cloud management circuitry 106 generates performance and/or health metrics corresponding to the example resource platform 102 and/or the example network 104 (e.g., bandwidth, throughput, latency, error rate, etc.). In some examples, the cloud management circuitry 106 accesses the resource platform(s) 102 to provision computing resources and communicates with a resource manager.

A user and/or administrator may set up and/or create a cloud account (e.g., a Google® cloud platform (GCP) account, a network security virtualization platform (NSX) account, a VMware® cloud foundation (VCF) account, a vSphere® account, etc.) to connect a cloud provider and/or a private cloud so that the cloud management circuitry 106 of FIG. 1 can collect data from regions of datacenters and/or to allow a user and/or administrator to deploy and/or provision cloud templates to the regions. A cloud template is a file that defines a set of resources. The cloud template may utilize tools to create server builds that can become standards for cloud applications.

The example cloud management circuitry 106 of FIG. 1 periodically performs health checks based on cloud accounts generated by a user or administrator using the example client interface(s) 110. To perform a health check, the example cloud management circuitry 106 attempts to access the cloud account to verify whether the account can be accessed and/or execute one or more protocols to validate the health of the cloud account. For each cloud account, the example cloud management circuitry 106 determines if the health check passed or failed. As described above, health check failures require more time and resources because a failed test can result in a threshold number of health check retries until a timeout occurs. Accordingly, in order to conserve resources and free up resources and time to perform other tasks, the example cloud management circuitry 106 may decrease the health check frequency (e.g., polling frequency) and/or suspend health checks for cloud accounts that fail more than a threshold number of health checks.

The example client interface(s) 110 of FIG. 1 is a graphical user interface (GUI) that enables end users (e.g., administrators, software developers, etc.) to interact with the example computing environment 100. The example client interface(s) 110 enables end users to initiate compute issue(s) remediation and view graphical illustrations of compute resource performance and/or health metrics. For example, when a health check of a cloud account fails, the example cloud management circuitry 106 may transmit information to be displayed on the example client interface(s) 110 regarding the failure. The information may include reasons why a health check failed, a timestamp of the failure(s), a number of failure(s), information related to how to fix the account to avoid a failure, links to URLs that will help mitigate the failure, a status of the account (e.g., healthy, unhealthy, the current polling frequency of the account, suspended, etc.), flagged alerts, etc. In examples disclosed herein, an end user(s) may remediate cloud account issues via interactions with the example client interface(s) 110. For example, the end user(s) may update credentials associated with the cloud account using the client interface(s) 110. In some examples, the end user(s) may interact with the client interface(s) 110 to perform other operations to mitigate a health check failure. For example, an end user(s) may create and configure new operations, configure functions of adapters, configure one or more agents (e.g., an agent that runs on an end user device to interface with a server management software (e.g., vCenter®) corresponding to the customer infrastructure of the end user drive) via the example client interface(s) 110). In some examples, another component of the system may install and execute the new action adapters to resolve computing issues in the example resource platform(s) 102 and/or to perform the actions when requested by an end user. In some examples, the client interface(s) 110 may be presented on any type(s) of display device such as, for example, a touch screen, a liquid crystal display (LCD), a light emitting diode (LED), etc. In examples disclosed herein, the example computing environment 100 may include one or more client interfaces 110.

Figure 2:
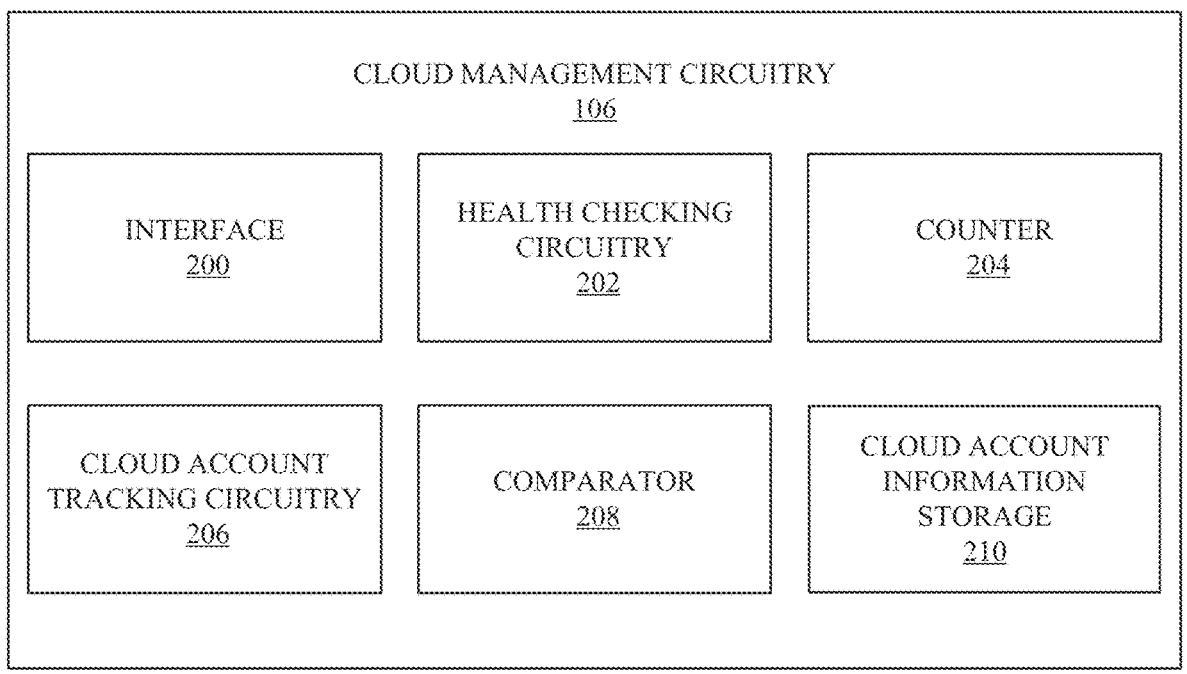
FIG. 2 is a block diagram of an example implementation of the example cloud management circuitry of FIG. 1.

FIG. 2 is a block diagram of an example implementation of the cloud management circuitry 106 of FIG. 1. The cloud management circuitry 106 of FIG. 2 may be instantiated (e.g., creating an instance of, bring into being for any length of time, materialize, implement, etc.) by processor circuitry such as a central processing unit executing instructions. Additionally or alternatively, the cloud management circuitry 106 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by one or more virtual machines and/or containers executing on the microprocessor. The example cloud management circuitry 106 includes an example interface 200, example health checking circuitry 202, an example counter 204, example cloud account tracking circuitry 206, an example comparator 208, and example cloud account information storage 210.

The example interface 200 of FIG. 2 obtains (e.g., accesses, receives, etc.) and or transmits (e.g., sends, outputs, etc.) data via the example network 104. For example, the interface 200 may output and/or obtain data (e.g., health status probes) to perform a health check (e.g., transmit user credentials, instructions, etc.) to the example resource platform(s) 102 and/or a device that implement the client interface(s) 110 of FIG. 1. Additionally, the example interface 200 may transmit alerts, tags, instructions, and/or any other information related to a cloud account to a user via the client interface(s) 110.

The example health checking circuitry 202 of FIG. 2 performs health checks on cloud accounts, periodically, aperiodically, and/or based on a trigger. The health checking circuitry 202 may attempt to access a cloud account (e.g., using the example interface 200). If the attempt fails (e.g., the cloud account could not be accessed), the example health checking circuitry 202 determines that the health check has failed. If the attempt succeeds (e.g., the cloud account was accessed), the example health checking circuitry 202 may perform one or more protocols to check the health of the cloud account. During a health check, the health checking circuitry 202 checks the health of multiple cloud accounts. During the check of a single health check of the health check of the multiple health accounts, the health checking circuitry 202 may perform the health check for the single cloud account multiple times when a failure occurs. The number of retries within a signal health check is based on user and/or manufacturer preferences. If the multiple re-attempts fails, the health checking circuitry 202 flags the cloud account as unhealthy or having failed the health check. The example health checking circuitry 202 checks the health of the cloud accounts at different frequencies depending on the status of the health accounts. For example, the health checking circuitry 202 may check all healthy accounts and accounts that have failed less than a first threshold number of times in a row at a first frequency (e.g., every 10 minutes). Cloud accounts that have failed more than the first threshold number of times in a row may be flagged as a first level failure. Accordingly, the example health checking circuitry 202 may only check first level failure accounts at a second frequency (e.g., every hour). Cloud accounts that have failed more than a second threshold number of times in a row may be flagged as second level failures (e.g., lower than the first level failures). Accordingly, the example health checking circuitry 202 may only check second level failure accounts at a third frequency (e.g., every day). Cloud accounts that have failed more than a third threshold number of times in a row may be flagged as suspended and/or unavailable. The example health checking circuitry 202 does not perform a health check on suspended and/or unavailable accounts until a user and/or administrator has manually re-validated the accounts (e.g., by invoking a dedicated service application program interface (API)). The example health checking circuitry 202 may access polling information from the cloud account information storage 210 to determine which cloud accounts to perform a health check on based on the polling frequency of the cloud accounts.

The example counter 204 of FIG. 2 tracks the number of failures of cloud accounts. For example, if the health checking circuitry 202 determines that a particular account resulting in a timeout and/or failure, the counter 204 increments a failure count for the particular account. If the particular account passes a health check, the counter 204 resets the failure count to zero. In some examples, if the number of failures for a cloud account at a particular level corresponding to a health check polling frequency exceeds a threshold, the counter 204 resets the count so that a new count can start for a different level corresponding to a different (e.g., lower) health check polling frequency. In some examples, the counter 204 increments a value in entries corresponding to a count stored in storage, a register, memory, etc. In some examples, the count is included in an entry in the cloud account information storage 210. In such examples, the counter 204 can increment and/or reset a count corresponding to a cloud account based on the results of a health check.

The example cloud account tracking circuitry 206 of FIG. 2 tracks the status and/or levels of the cloud accounts based on results of the health checking circuitry 202 and/or outputs of the comparator 208. For example, initially, the cloud account tracking circuitry 206 reserves an entry in the cloud account information storage 210 for each generated cloud account and may initialize the entries (e.g., initialize counters, tag account as healthy, set polling frequency to highest polling frequency). The entries include information such as the status of the cloud accounts (e.g., health, unhealthy, suspended), historic health check data of the cloud accounts, the failure counts of the cloud accounts, the polling frequency for the cloud accounts, etc. Additionally, the example cloud account tracking circuitry 206 updates the cloud account status, historical health check data, and/or polling frequency for the cloud accounts in the entries of the cloud account information storage 1210 for the corresponding cloud accounts. For example, if a cloud account fails a first health check, the example cloud account tracking circuitry 206 may update the entry that corresponds to the cloud account to change the status from healthy to unhealthy.

If the comparator 208 of FIG. 2 determines that a failure count of a cloud account meets and/or reaches one or more thresholds corresponding to one or more health check polling frequencies, the cloud account tracking circuitry 206 can update health check polling frequency. For example, if the failure count for a cloud account at the first polling frequency (e.g., for healthy accounts and accounts that have failed less than a first threshold number of times in a row) meets and/or reaches a threshold (e.g., 10), the cloud account tracking circuitry 206 can change the polling level of the cloud account from the first level (e.g., at the first frequency of every 10 minutes) to a second level lower than the first level (e.g., at a second frequency of every hour). If the failure count for the cloud account at the second polling frequency (e.g., for the second level) meets and/or reaches a threshold (e.g., 24), the cloud account tracking circuitry 206 can change the polling level of the cloud account from the second level (e.g., at the second frequency of every hour) to a third level lower than the second level (e.g., at a third frequency of every day). If the failure count for the cloud account at the third polling frequency (e.g., for the third level cloud accounts) meets a threshold (e.g., 7), the cloud account tracking circuitry 206 can change the status of the cloud account to suspended to prevent further health checks until a user and/or administrator manually re-validates the cloud account. The number of polling levels, the threshold number of failures corresponding to the polling levels, and/or the polling frequencies can be set to any value and/or may be based on user and/or manufacturer preferences. Additionally, the example cloud account tracking circuitry 206 updates the historical data of a cloud account (e.g., as cloud account metadata) in the example cloud account information storage 210 in response to a health check.

The example comparator 208 of FIG. 2 compares the failure counts (e.g., incremented by the example counter 204) to one or more thresholds. As described above, when a cloud account has failed more than a threshold number of times in a row, the example cloud account tracking circuitry 206 can decrease the health check polling frequency of the cloud account. Accordingly, the example comparator 208 compares failure counts of cloud accounts to one or more thresholds to indicate, to the example cloud account tracking circuitry 206, which cloud accounts need to change polling levels and/or be suspended.

The example cloud account information storage 210 of FIG. 2 stores data and/or metadata related to the cloud accounts. For example, the cloud account information storage 210 stores a status, a failure count, a polling level, historical health check data (e.g., including timestamps), reasons for a failure, etc. for each cloud account.

While an example manner of implementing the cloud management circuitry 106 of FIG. 1 is illustrated in FIG. 2, one or more of the elements, processes, and/or devices illustrated in FIG. 2 may be combined, divided, re-arranged, omitted, eliminated, and/or implemented in any other way. Further, the example interface 200, the example health checking circuitry 202, the example counter 204, the example cloud account tracking circuitry 206, the example comparator 208, the example cloud account information storage 210, and/or, more generally, the cloud management circuitry 106 of FIG. 2, may be implemented by hardware, software, firmware, and/or any combination of hardware, software, and/or firmware. Thus, for example, any of the example interface 200, the example health checking circuitry 202, the example counter 204, the example cloud account tracking circuitry 206, the example comparator 208, the example cloud account information storage 210, and/or, more generally, the cloud management circuitry 106 of FIG. 2, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the cloud management circuitry 106 of FIGS. 1-2 is/are hereby expressly defined to include a non-transitory computer readable storage device or storage disk such as a memory, a digital versatile disk (DVD), a compact disk (CD), a Blu-ray disk, etc., including the software and/or firmware. Further still, the cloud management circuitry 106 of FIG. 2 may include one or more elements, processes, and/or devices in addition to, or instead of, those illustrated in FIG. 2, and/or may include more than one of any or all of the illustrated elements, processes, and devices.

Flowcharts representative of example hardware logic circuitry, machine readable instructions, hardware implemented state machines, and/or any combination thereof for implementing the cloud management circuitry 106 are shown in FIGS. 3A-4B. The machine readable instructions may be one or more executable programs or portion(s) of an executable program for execution by processor circuitry, such as the processor circuitry 512 shown in the example processor platform 500 discussed below in connection with FIG. 5 and/or the example processor circuitry discussed below in connection with FIG. 5. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIGS. 3A-4B, many other methods of implementing the cloud management circuitry 106 of FIG. 2 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or compute devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a compute device and/or other machine. For example, the machine readable instructions may be stored in multiple parts, which are individually compressed, encrypted, and/or stored on separate compute devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular compute device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 3A-4B may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 3A:
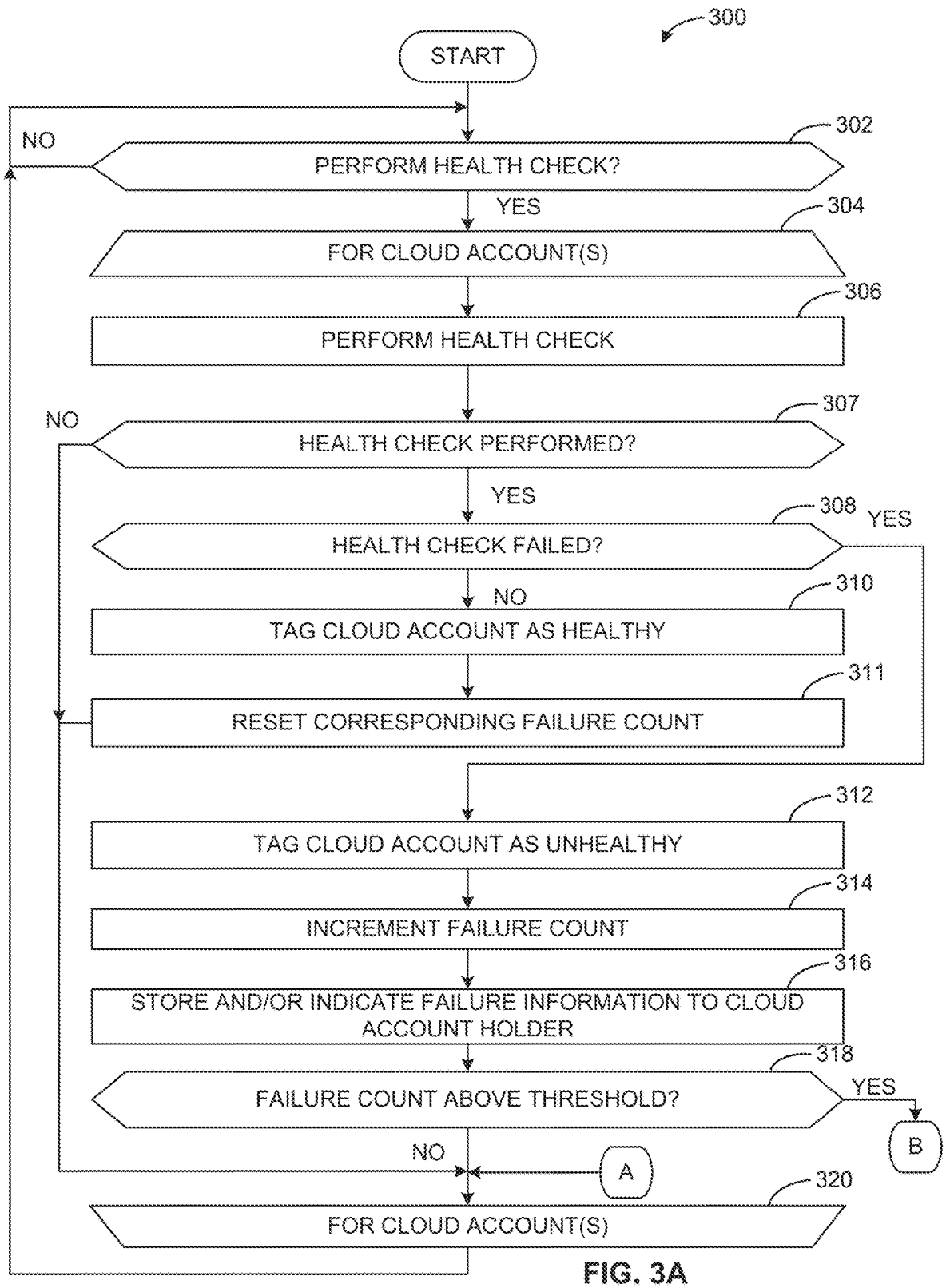
FIGS. 3A-3B illustrates a flowchart representative of example machine readable instructions that may be executed by example processor circuitry to implement the example cloud management circuitry of FIGS. 1 and/or 2.
Figure 3B:
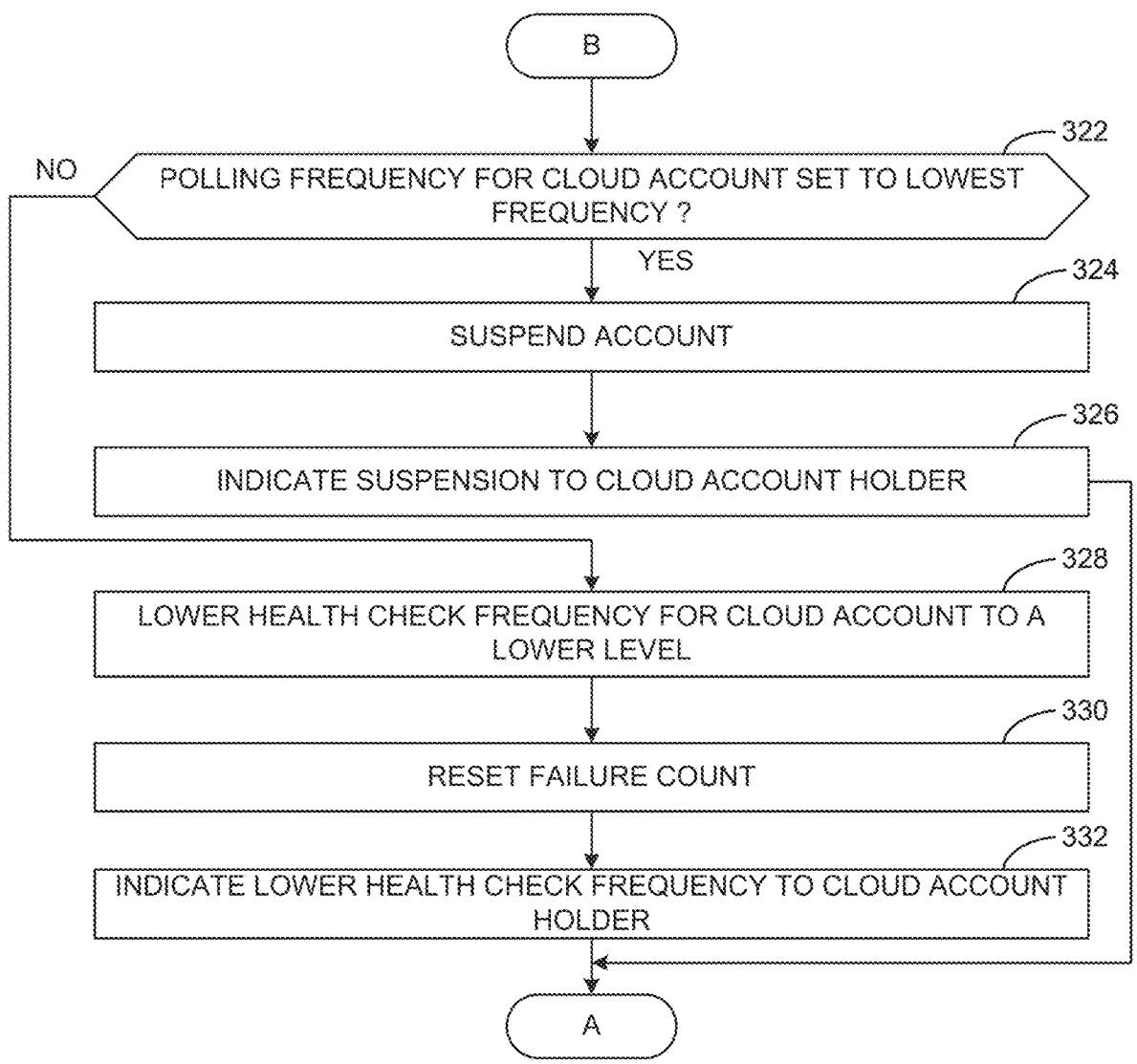

FIGS. 3A-3B illustrate is a flowchart representative of example machine readable instructions and/or example operations 300 that may be executed and/or instantiated by processor circuitry (e.g., the example cloud management circuitry 106 of FIGS. 1 and/or 2) to conserve resources when performing an account health check. The instructions begin at block 302 when the example health checking circuitry 202 determines if a health check should be performed. For example, the health checking circuitry 202 may be structured and/or programmed to perform a health check every 10-15 minutes. In such an example, the health checking circuitry 202 may include and/or access a clock or timer to determine if it is time to perform a health check.

For all cloud account(s) corresponding to the health check (blocks 304-320), the example health checking circuitry 202 performs a health check (block 306). As described above, different cloud accounts may correspond to different polling frequencies and/or polling levels. Accordingly, the health checking circuitry 202 performs the health check for the cloud accounts with levels that corresponding to the current health check. For example, the health checking circuitry 202 may determine that some of the accounts should only be checked every 10 health checks at the regular healthy prolling frequency. In such an example, if the current iteration of health checks is not the tenth health check, the health checking circuitry 202 will not check the health of those cloud accounts. In some examples, the number of health checks can be tracked (e.g., by the example counter 204) and the example health checking circuitry 202 can determine which accounts to check based on a modulus and/or division operation. The example health checking circuitry 202 can perform a health check using the interface 200 to attempt to access the cloud account and/or perform one or more protocols based on the accessed cloud account. Because some of the cloud accounts may not be scheduled to perform a health check and/or may already be suspended, the example cloud account tracking circuitry 206 may determine if a health check of a particular cloud account was performed (block 307). If the cloud account was not scheduled to have a health check performed at this time, the cloud account tracking circuitry 206 skips the cloud account until it is scheduled to have a health check performed and/or is verified and removed from suspension. Accordingly, if the example cloud account tracking circuitry 206 determines that a health check for the particular cloud account was not performed (block 307: NO), control continues to block 320 to process a different cloud account.

If the example cloud account tracking circuitry 206 determines that a health check for the particular cloud account was performed (block 307: YES), the example cloud account tracking circuitry 206 determines if the health test failed (e.g., based on an output of the health checking circuitry 202) (block 308). If the example cloud account tracking circuitry 206 determines that the health test for the cloud account did not fail (e.g., the health test passed) (block 308: NO), the example cloud account tracking circuitry 206 tags the cloud account as healthy (e.g., by indicating the status of the account as healthy in the example cloud account information storage 210) (block 310). At block 311, the example counter 204 resets the failure count corresponding to the cloud account and control continues to block 320. If the example cloud account tracking circuitry 206 determines that the health test for the cloud account failed (block 308: YES), the example cloud account tracking circuitry 206 tags the cloud account as unhealthy and/or not accessible (e.g., by indicating the status of the account as unhealthy in the example cloud account information storage 210) (block 312).

At block 314, the example counter 204 increments the failure count for the cloud account. As described above, the failure count corresponds to the number of health checks that the cloud account has failed and/or timed out in a row. At block 316, the example cloud account tracking circuitry 206 stores and/or indicates the failure information to the cloud account holder (e.g., a user and/or administrator). For example, the cloud account tracking circuitry 206 can store the failure information in an entry of the cloud account information storage 210 as part of historical data. The failure information may include reasons why the health check failed, a number of failures for the cloud account, a timestamp for the health check, a status of the cloud account, a polling level of the cloud account, etc. Additionally, the example cloud account tracking circuitry 206 can transmit an indication to the cloud account holder via the example interface 200. For example, the cloud account tracking circuitry 206 may transmit the failure information and/or an indication that the health check failed to the example client interface(s) 110 to display and/or alert the user. In some examples, the cloud account tracking circuitry 206 may transmit a text message and/or email to a phone number and/or email address corresponding to the cloud account that includes the failure information and/or a link to further information.

At block 318, the example comparator 208 determines if the failure count corresponding to the cloud account is above (e.g., satisfies) a threshold. As described above, there may be different thresholds for different polling levels. Accordingly, the example comparator 208 may access the cloud account information storage 210 to determine the current polling level of the cloud account and identify the threshold that corresponds to the current polling level. If the example comparator 208 determines that the failure count is not above the threshold (block 318: NO), control continues to block 320. If the example comparator 208 determines that the failure count is above the threshold (block 318: YES), the cloud account tracking circuitry 206 determines if the polling frequency for the cloud account is set to the lowest frequency (e.g., corresponding to the lowest polling level before an account is suspended) (block 322 of FIG. 3B). As described above, there may be multiple polling levels corresponding to multiple polling frequencies that a cloud account can be polled at until the cloud account is finally suspended. The number of polling levels and/or corresponding thresholds can be set to any value based on user and/or manufacturer preferences.

If the cloud account tracking circuitry 206 determines that the polling frequency for the cloud account is set to the lowest frequency (block 322: YES), the cloud account tracking circuitry 206 suspends the cloud account by changing a value corresponding to the status of the cloud account in the cloud account information storage 210 from a value corresponding to a suspended cloud account (block 324). In this manner, when the example health checking circuitry 202 performs a subsequent health check, the example health checking circuitry 202 will prevent the health check for the suspended cloud account. At block 326, the cloud account tracking circuitry 206 indicates the suspension to the cloud account holder using the example interface 200. For example, the cloud account tracking circuitry 206 may transmit the suspension alert and/or an indication to the example client interface(s) 110 to display and/or alert the user. In some examples, the cloud account tracking circuitry 206 may transmit a text message and/or email to a phone number and/or email address corresponding to the cloud account that includes the suspension information and/or a link to further information. After block 326, the instructions return to block 320 of FIG. 3A.

If the cloud account tracking circuitry 206 determines that the polling frequency for the cloud account is not set to the lowest frequency (block 322: NO), the cloud account tracking circuitry 206 lowers the health check frequency for the cloud account to a lower level by changing a value corresponding to the polling frequency of the cloud account in the cloud account information storage 210 from a value corresponding to the lower level (block 328). In this manner, when the example health checking circuitry 202 performs a subsequent health check, the example health checking circuitry 202 will only poll the cloud account based on the lower polling frequency. For example, if the polling frequency changed from every hour to every day, the example health checking circuitry 202 will only poll the cloud account every day until the cloud account passes a health check and/or is manually re-evaluated.

At block 330, the example counter 204 resets the failure count for the cloud account. In this manner, a new failure count can be started for the new lower polling frequency. In some examples, the thresholds for the polling levels may be based on a total failures across all levels. In such examples, the failure count is not reset and block 330 can be skipped. At block 332, the example cloud account tracking circuitry 206 indicates the lower health check frequency and/or level to the cloud account holder. For example, the cloud account tracking circuitry 206 may transmit an alert and/or an indication to the example client interface(s) 110 to display and/or alert the user to the lower health check frequency and/or level. In some examples, the cloud account tracking circuitry 206 may transmit a text message and/or email to a phone number and/or email address corresponding to the cloud account that includes the health check information and/or a link to further information. After block 332, the instructions return to block 320 of FIG. 3A The operations of blocks 304-320 can be executed in parallel (e.g., using multiple processor and/or processor cores) or in serial.

Figure 4A:
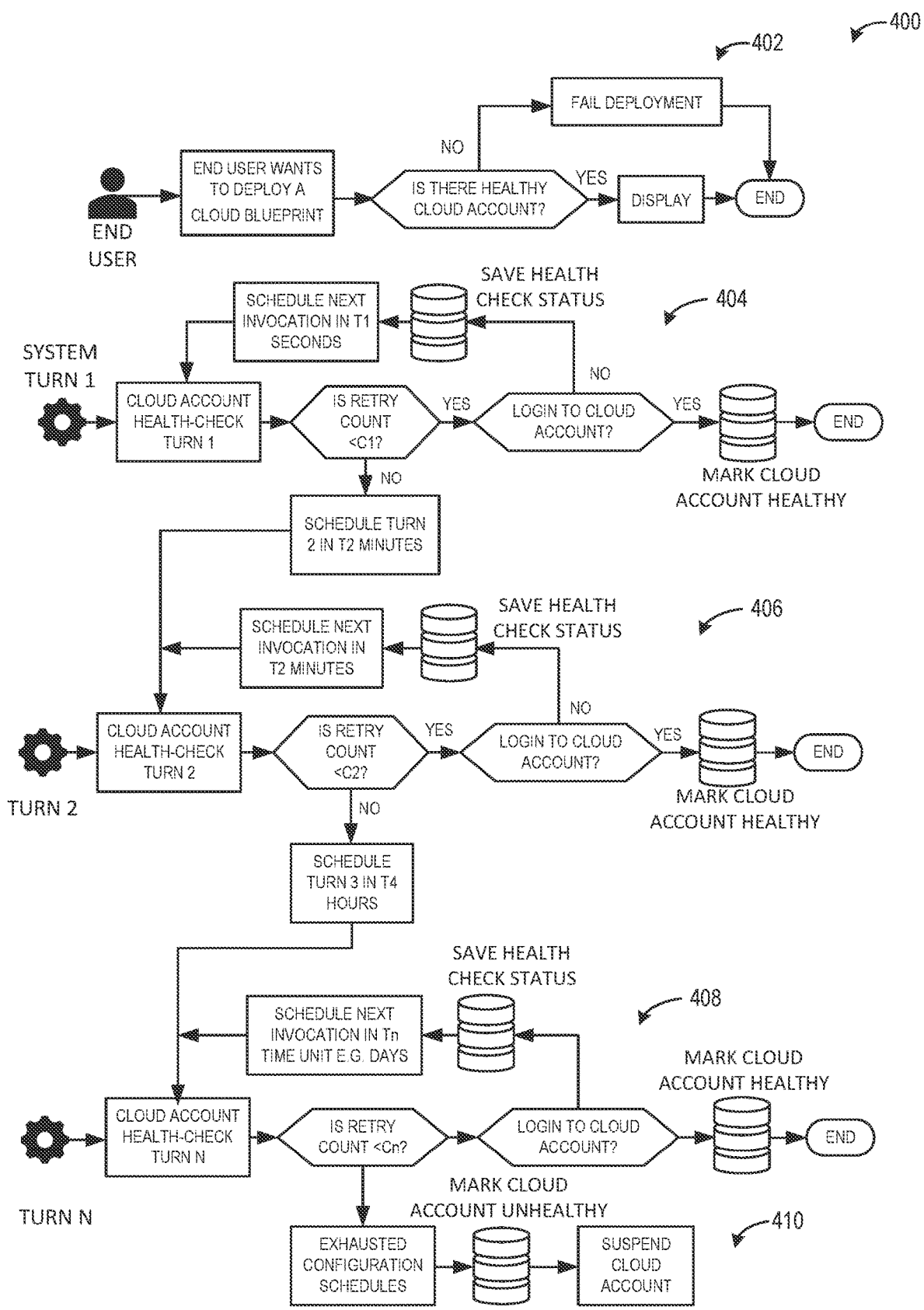
FIG. 4A-4B illustrates diagram that may be implemented using the example cloud management circuitry of FIGS. 1 and/or 2.
Figure 4B:
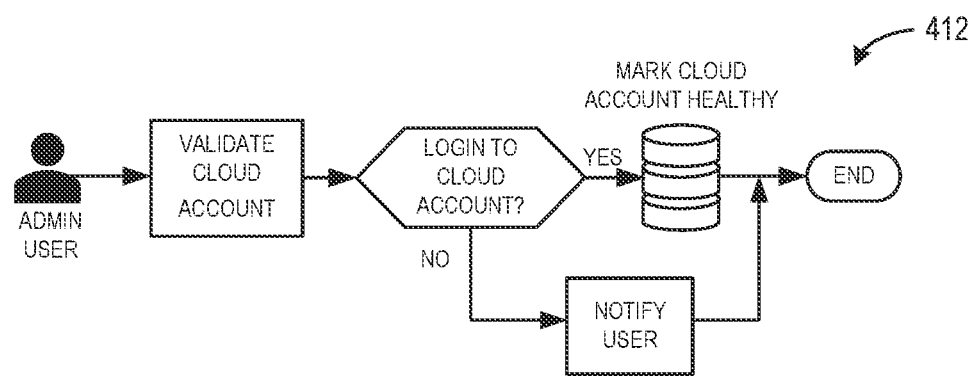

FIGS. 4A and 4B illustrate flowcharts representative of example machine readable instructions and/or example operations that may be executed and/or instantiated by processor circuitry (e.g., the cloud management circuitry 106 of FIG. 2) corresponding to an example implementation of examples disclosed herein in conjunction with example phases 402, 404, 406, 408, 410, 412.

During an example initiation phase 402, the end user wants to deploy a cloud blueprint. Accordingly, the user uses the example client interface(s) 110 of FIG. 1 to determine if there is a health cloud account that can be used and/or generated to deploy the cloud blueprint. If there is a healthy cloud account, the cloud blueprint is deployed and the initial phase 402 ends. If there is not a healthy cloud account, the cloud blueprint fails and the initial phase 402 ends.

After a cloud blueprint has been deployed using a healthy cloud account, the example second phase 404 (e.g., Turn 1) begins where the example health checking circuitry 202 performs a health check at a first polling frequency corresponding to healthy cloud accounts and/or cloud accounts that have failed less than a first threshold amount of time (C1). If the number of retries and/or failures is below the C1 threshold, the example health checking circuitry 202 performs the health check of the account by attempting to login to the account. If the login attempt is successful, the example cloud account tracking circuitry 206 marks the cloud account as healthy (e.g., using the example cloud account information storage 210) and the flow ends. If the login attempt is unsuccessful, the example cloud account tracking circuitry 206 saves the information related to the failure in the example cloud account information storage 210 and schedules another attempt after a threshold number of time (e.g., based on user and/or manufacturer preferences). If the C1 threshold number of attempts fail, the cloud account tracking circuitry 206 decreases the polling frequency for the cloud account to a lower level (e.g., Turn 2) and the process enters into the third example phase 406. The third phase 406 performs the same technique as the second phase 404 but at a lower polling frequency (e.g., after a threshold amount of timer longer than the threshold amount of time for the second phase 404) and/or with a different threshold failure/retry count (C2).

If the C2 threshold number of attempts fail, the cloud account tracking circuitry 206 decreases the polling frequency for the cloud account to a lower level (e.g., Turn 3) and the process enters into the fourth example phase 408. The fourth phase 408 performs the same technique as the third phase 406 but at a lower polling frequency (e.g., after a threshold amount of timer longer than the threshold amount of time for the third phase 406) and/or with a different threshold failure/retry count (Cn). Although there are 3 turns in the example of FIG. 4A, there may be any number of phases corresponding to any number of polling frequencies and/or thresholds. If the Cn threshold number of attempts fail, the cloud account tracking circuitry 206 suspends the cloud account in the fifth phase 410. As described above, the example cloud account tracking circuitry 206 suspends the cloud account by changing a value corresponding to the status of the cloud account in the cloud account information storage 210.

FIG. 4B shows a sixth phase 412, where the user can manually re-evaluate a suspended cloud account. In FIG. 4B, the user validates the cloud account using the example client interface(s) 110 of FIG. 1. After validated, the user and/or the example cloud account tracking circuitry 206 attempts to login to the cloud account. If the login is successful, the example cloud account tracking circuitry 206 marks the cloud account is healthy, but changing a value corresponding to the status of the cloud account in the cloud account information storage 210. If the login failed, the example notifies the user (e.g., via the client interface(s) 110, a text, a phone call, an email, etc.) using the example interface 200.

Figure 5:
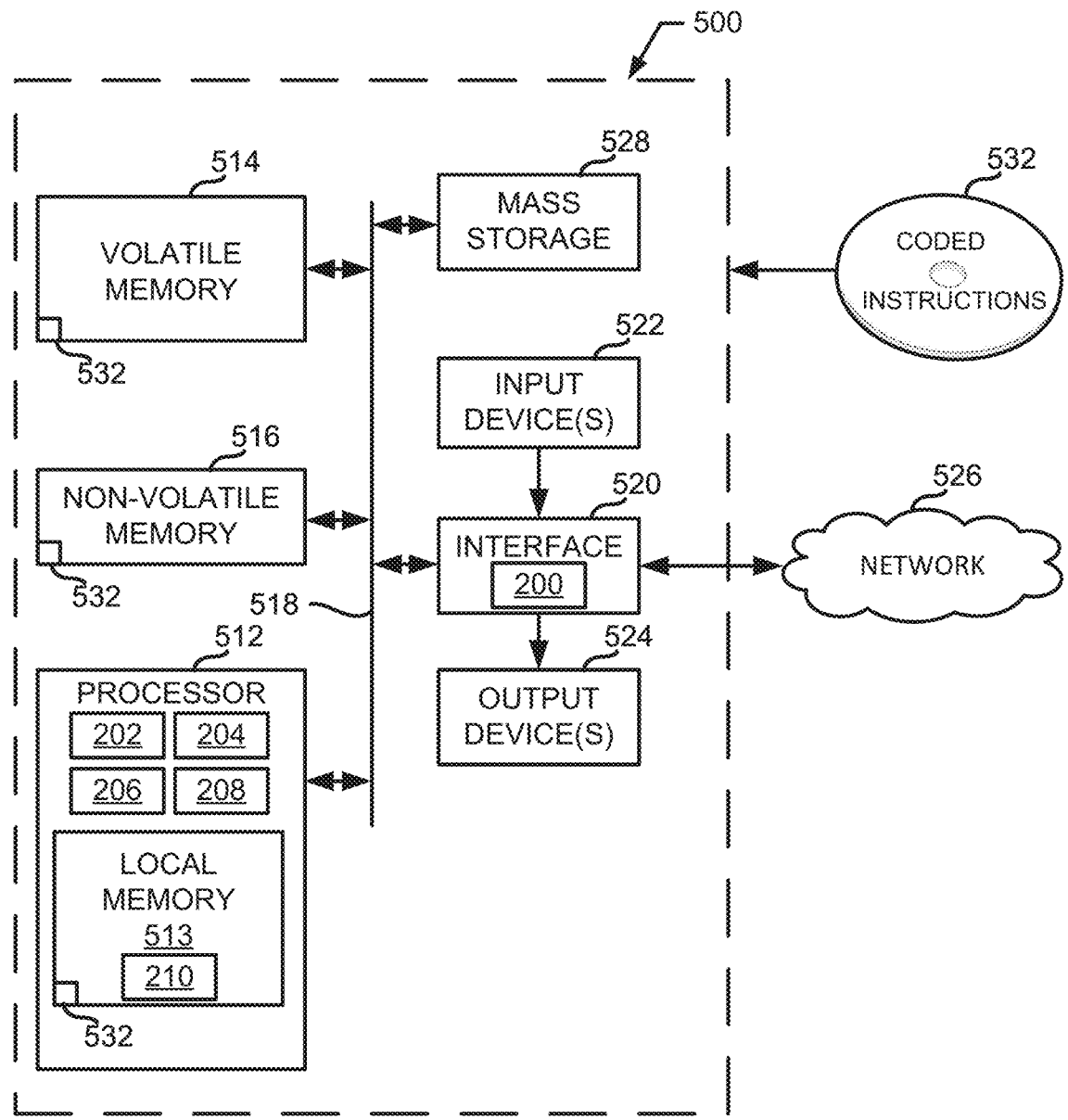
FIG. 5 is a block diagram of an example processor platform including processor circuitry structured to execute the example machine readable instructions of FIGS. 3A-3B to implement the example cloud management circuitry of FIGS. 1 and/or 2.

FIG. 5 is a block diagram of an example processor platform 500 structured to execute and/or instantiate the machine readable instructions and/or operations of FIGS. 3A-4B to implement the cloud management circuitry 106 of FIG. 2. The processor platform 500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 500 of the illustrated example includes processor circuitry 512. The processor circuitry 512 of the illustrated example is hardware. For example, the processor circuitry 512 can be implemented by one or more integrated circuits, logic circuits, FPGAs microprocessors, CPUs, GPUs, DSPs, and/or microcontrollers from any desired family or manufacturer. The processor circuitry 512 may be implemented by one or more semiconductor based (e.g., silicon based) devices. In this example, the processor circuitry 512 implements the example health checking circuitry 202, the example counter 204, the example cloud account tracking circuitry 206, and the example comparator 208 of FIG. 2

The processor circuitry 512 of the illustrated example includes a local memory 513 (e.g., a cache, registers, etc.). In the example of FIG. 5, the example local memory 513 implements the example storage 210. Access to the main memory 514, 516 of the illustrated example is controlled by a memory controller 517. The processor circuitry 512 of the illustrated example is in communication with a main memory including a volatile memory 514 and a non-volatile memory 516 by a bus 518. The volatile memory 514 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 516 may be implemented by flash memory and/or any other desired type of memory device. The example main memory 514, 516 and/or the local memory 513 may implement the example cloud account information storage 210 of FIG. 1.

The processor platform 500 of the illustrated example also includes interface circuitry 520. The interface circuitry 520 may be implemented by hardware in accordance with any type of interface standard, such as an Ethernet interface, a universal serial bus (USB) interface, a Bluetooth® interface, a near field communication (NFC) interface, a PCI interface, and/or a PCIe interface. The example interface circuitry 520 may implement the example interface 200 of FIG. 2.

In the illustrated example, one or more input devices 522 are connected to the interface circuitry 520. The input device(s) 522 permit(s) a user to enter data and/or commands into the processor circuitry 512. The input device(s) 522 can be implemented by, for example, an audio sensor, a microphone, a camera (still or video), a keyboard, a button, a mouse, a touchscreen, a track-pad, a trackball, an isopoint device, and/or a voice recognition system.

One or more output devices 524 are also connected to the interface circuitry 520 of the illustrated example. The output devices 524 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 520 of the illustrated example, thus, typically includes a graphics driver card, a graphics driver chip, and/or graphics processor circuitry such as a GPU.

The interface circuitry 520 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 526. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 500 of the illustrated example also includes one or more mass storage devices 528 to store software and/or data. Examples of such mass storage devices 528 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 532, which may be implemented by the machine readable instructions of FIGS. 3A-4B, may be stored in the mass storage device 528, in the volatile memory 514, in the non-volatile memory 516, and/or on a removable non-transitory computer readable storage medium such as a CD or DVD.

Figure 6:
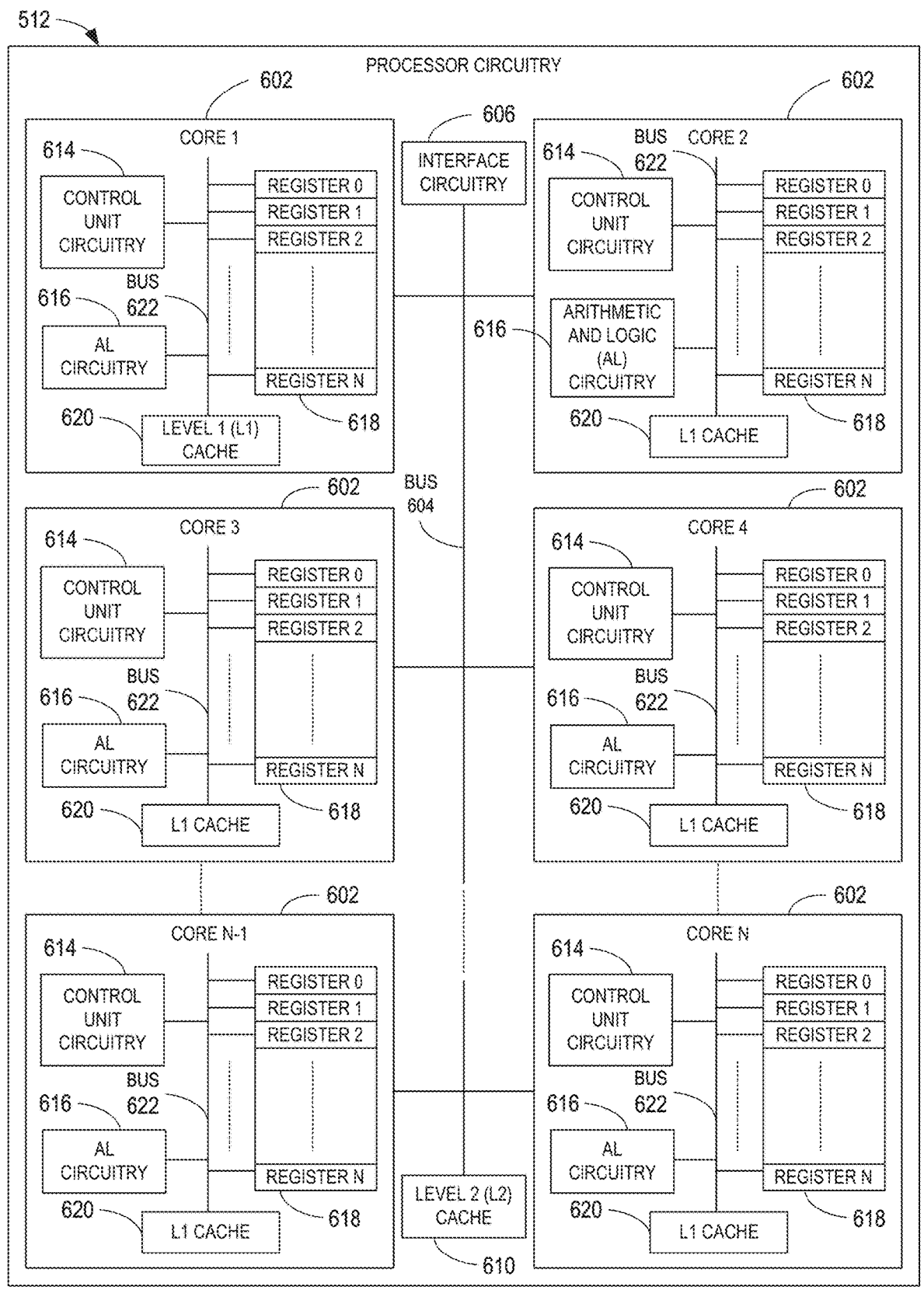
FIG. 6 is a block diagram of an example implementation of the processor circuitry of FIG. 5.

FIG. 6 is a block diagram of an example implementation of the processor circuitry 512 of FIG. 5. In this example, the processor circuitry 512 of FIG. 5 is implemented by a microprocessor 512. For example, the microprocessor 600 may implement multi-core hardware circuitry such as a CPU, a DSP, a GPU, an XPU, etc. Although it may include any number of example cores 602 (e.g., 1 core), the microprocessor 512 of this example is a multi-core semiconductor device including N cores. The cores 602 of the microprocessor 512 may operate independently or may cooperate to execute machine readable instructions. For example, machine code corresponding to a firmware program, an embedded software program, or a software program may be executed by one of the cores 602 or may be executed by multiple ones of the cores 602 at the same or different times. In some examples, the machine code corresponding to the firmware program, the embedded software program, or the software program is split into threads and executed in parallel by two or more of the cores 602. The software program may correspond to a portion or all of the machine readable instructions and/or operations represented by the flowchart of FIG. 3-5.

The cores 602 may communicate by an example bus 604. In some examples, the bus 604 may implement a communication bus to effectuate communication associated with one(s) of the cores 602. For example, the bus 604 may implement at least one of an Inter-Integrated Circuit (I2C) bus, a Serial Peripheral Interface (SPI) bus, a PCI bus, or a PCIe bus. Additionally or alternatively, the bus 604 may implement any other type of computing or electrical bus. The cores 602 may obtain data, instructions, and/or signals from one or more external devices by example interface circuitry 606. The cores 602 may output data, instructions, and/or signals to the one or more external devices by the interface circuitry 606. Although the cores 602 of this example include example local memory 620 (e.g., Level 1 (L1) cache that may be split into an L1 data cache and an L1 instruction cache), the microprocessor 512 also includes example shared memory 610 that may be shared by the cores (e.g., Level 2 (L2_cache)) for high-speed access to data and/or instructions. Data and/or instructions may be transferred (e.g., shared) by writing to and/or reading from the shared memory 610. The local memory 620 of each of the cores 602 and the shared memory 610 may be part of a hierarchy of storage devices including multiple levels of cache memory and the main memory (e.g., the main memory 514, 516 of FIG. 5). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 602 may be referred to as a CPU, DSP, GPU, etc., or any other type of hardware circuitry. Each core 602 includes control unit circuitry 614 (e.g., control circuitry), arithmetic, and logic (AL) circuitry (sometimes referred to as an ALU) 616, a plurality of registers 618, the L1 cache 620, and an example bus 622. Other structures may be present. For example, each core 602 may include vector unit circuitry, single instruction multiple data (SIMD) unit circuitry, load/store unit (LSU) circuitry, branch/jump unit circuitry, floating-point unit (FPU) circuitry, etc. The control unit circuitry 614 includes semiconductor-based circuits structured to control (e.g., coordinate) data movement within the corresponding core 602. The AL circuitry 616 includes semiconductor-based circuits structured to perform one or more mathematic and/or logic operations on the data within the corresponding core 602. The AL circuitry 616 of some examples performs integer based operations. In other examples, the AL circuitry 616 also performs floating point operations. In yet other examples, the AL circuitry 616 may include first AL circuitry that performs integer based operations and second AL circuitry that performs floating point operations. In some examples, the AL circuitry 616 may be referred to as an Arithmetic Logic Unit (ALU). The registers 618 are semiconductor-based structures to store data and/or instructions such as results of one or more of the operations performed by the AL circuitry 616 of the corresponding core 602. For example, the registers 618 may include vector register(s), SIMD register(s), general purpose register(s), flag register(s), segment register(s), machine specific register(s), instruction pointer register(s), control register(s), debug register(s), memory management register(s), machine check register(s), etc. The registers 618 may be arranged in a bank as shown in FIG. 6. Alternatively, the registers 618 may be organized in any other arrangement, format, or structure including distributed throughout the core 602 to shorten access time. The bus 622 may implement at least one of an I2C bus, a SPI bus, a PCI bus, or a PCIe bus Each core 602 and/or, more generally, the microprocessor 512 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 512 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 7:
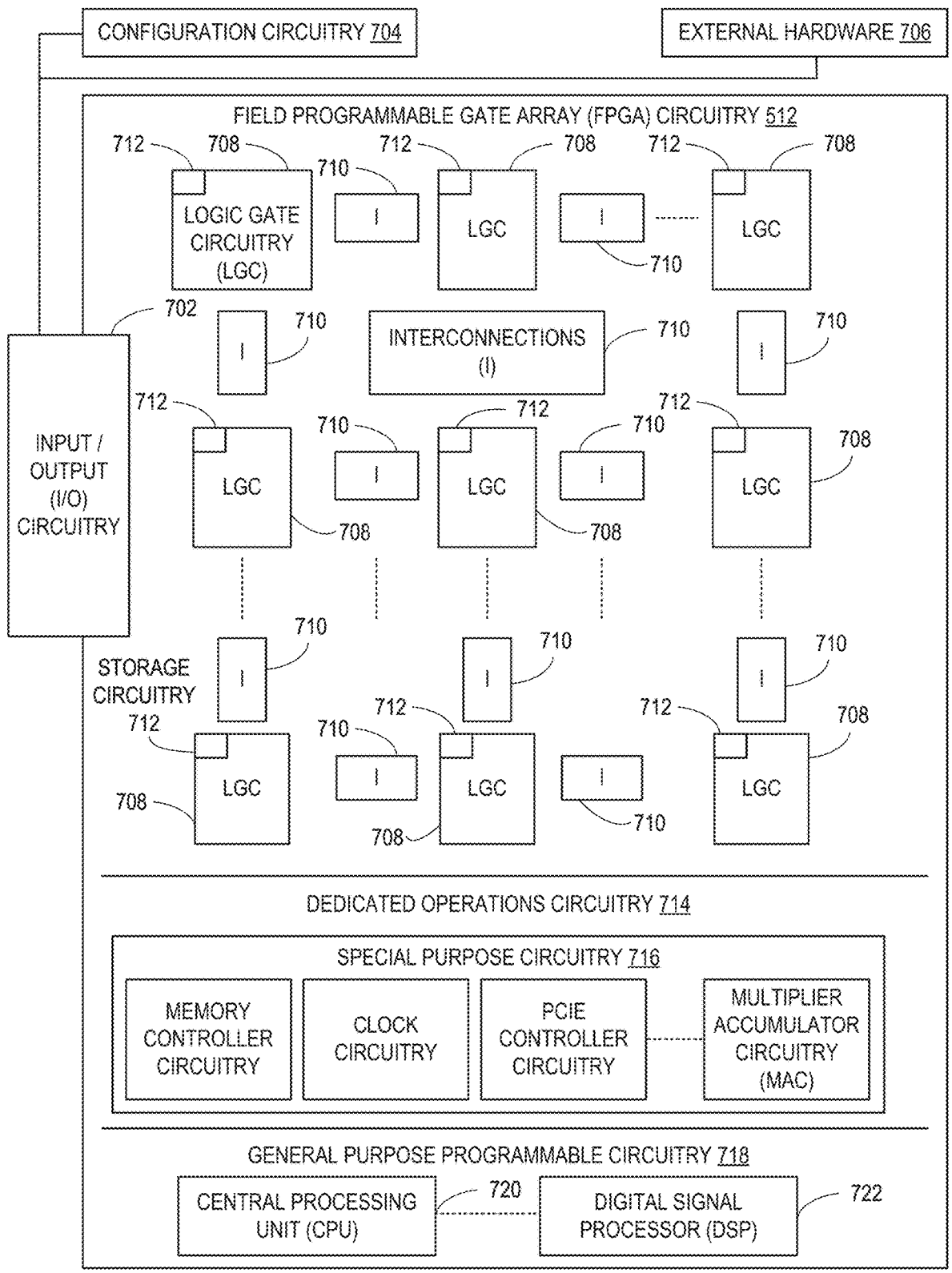
FIG. 7 is a block diagram of another example implementation of the processor circuitry of FIG. 5.

FIG. 7 is a block diagram of another example implementation of the processor circuitry 512 of FIG. 5. In this example, the processor circuitry 512 is implemented by FPGA circuitry 512. The FPGA circuitry 512 can be used, for example, to perform operations that could otherwise be performed by the example microprocessor 512 of FIG. 6 executing corresponding machine readable instructions. However, once configured, the FPGA circuitry 512 instantiates the machine readable instructions in hardware and, thus, can often execute the operations faster than they could be performed by a general purpose microprocessor executing the corresponding software.

More specifically, in contrast to the microprocessor 512 of FIG. 6 described above (which is a general purpose device that may be programmed to execute some or all of the machine readable instructions represented by the flowchart of FIGS. 3A-4B but whose interconnections and logic circuitry are fixed once fabricated), the FPGA circuitry 512 of the example of FIG. 7 includes interconnections and logic circuitry that may be configured and/or interconnected in different ways after fabrication to instantiate, for example, some or all of the machine readable instructions represented by the flowchart of FIGS. 3A-4B. In particular, the FPGA 512 may be thought of as an array of logic gates, interconnections, and switches. The switches can be programmed to change how the logic gates are interconnected by the interconnections, effectively forming one or more dedicated logic circuits (unless and until the FPGA circuitry 512 is reprogrammed). The configured logic circuits enable the logic gates to cooperate in different ways to perform different operations on data received by input circuitry. Those operations may correspond to some or all of the software represented by the flowchart of FIGS. 3A-4B. As such, the FPGA circuitry 512 may be structured to effectively instantiate some or all of the machine readable instructions of the flowchart of FIGS. 3A-4B as dedicated logic circuits to perform the operations corresponding to those software instructions in a dedicated manner analogous to an ASIC. Therefore, the FPGA circuitry 512 may perform the operations corresponding to the some or all of the machine readable instructions of FIG. 7 faster than the general purpose microprocessor can execute the same.

In the example of FIG. 7, the FPGA circuitry 512 is structured to be programmed (and/or reprogrammed one or more times) by an end user by a hardware description language (HDL) such as Verilog. The FPGA circuitry 512 of FIG. 7, includes example input/output (I/O) circuitry 702 to obtain and/or output data to/from example configuration circuitry 704 and/or external hardware (e.g., external hardware circuitry) 706. For example, the configuration circuitry 704 may implement interface circuitry that may obtain machine readable instructions to configure the FPGA circuitry 512, or portion(s) thereof. In some such examples, the configuration circuitry 704 may obtain the machine readable instructions from a user, a machine (e.g., hardware circuitry (e.g., programmed, or dedicated circuitry) that may implement an Artificial Intelligence/Machine Learning (AI/ML) model to generate the instructions), etc. In some examples, the external hardware 706 may implement the microprocessor 512 of FIG. 6. The FPGA circuitry 512 also includes an array of example logic gate circuitry 708, a plurality of example configurable interconnections 710, and example storage circuitry 712. The logic gate circuitry 708 and interconnections 710 are configurable to instantiate one or more operations that may correspond to at least some of the machine readable instructions of FIGS. 3A-4B and/or other desired operations. The logic gate circuitry 708 shown in FIG. 7 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 708 to enable configuration of the electrical structures and/or the logic gates to form circuits to perform desired operations. The logic gate circuitry 708 may include other electrical structures such as look-up tables (LUTs), registers (e.g., flip-flops or latches), multiplexers, etc.

The interconnections 710 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 708 to program desired logic circuits.

The storage circuitry 712 of the illustrated example is structured to store result(s) of the one or more of the operations performed by corresponding logic gates. The storage circuitry 712 may be implemented by registers or the like. In the illustrated example, the storage circuitry 712 is distributed amongst the logic gate circuitry 708 to facilitate access and increase execution speed.

The example FPGA circuitry 512 of FIG. 7 also includes example Dedicated Operations Circuitry 714. In this example, the Dedicated Operations Circuitry 714 includes special purpose circuitry 716 that may be invoked to implement commonly used functions to avoid the need to program those functions in the field. Examples of such special purpose circuitry 716 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 512 may also include example general purpose programmable circuitry 718 such as an example CPU 720 and/or an example DSP 722. Other general purpose programmable circuitry 718 may additionally or alternatively be present such as a GPU, an XPU, etc., that can be programmed to perform other operations.

Although FIGS. 6 and 7 illustrate two example implementations of the processor circuitry 512 of FIG. 5, many other approaches are contemplated. For example, as mentioned above, modern FPGA circuitry may include an onboard CPU, such as one or more of the example CPU 720 of FIG. 7. Therefore, the processor circuitry 512 of FIG. 5 may additionally be implemented by combining the example microprocessor 512 of FIG. 6 and the example FPGA circuitry 512 of FIG. 7. In some such hybrid examples, a first portion of the machine readable instructions represented by the flowchart of FIGS. 3A-4B may be executed by one or more of the cores 602 of FIG. 6 and a second portion of the machine readable instructions represented by the flowchart of FIGS. 3A-4B may be executed by the FPGA circuitry 512 of FIG. 7.

In some examples, the processor circuitry 512 of FIG. 5 may be in one or more packages. For example, the processor circuitry 512 of FIG. 6 and/or the FPGA circuitry 512 of FIG. 7 may be in one or more packages. In some examples, an XPU may be implemented by the processor circuitry 512 of FIG. 5, which may be in one or more packages. For example, the XPU may include a CPU in one package, a DSP in another package, a GPU in yet another package, and an FPGA in still yet another package.

Figure 8:
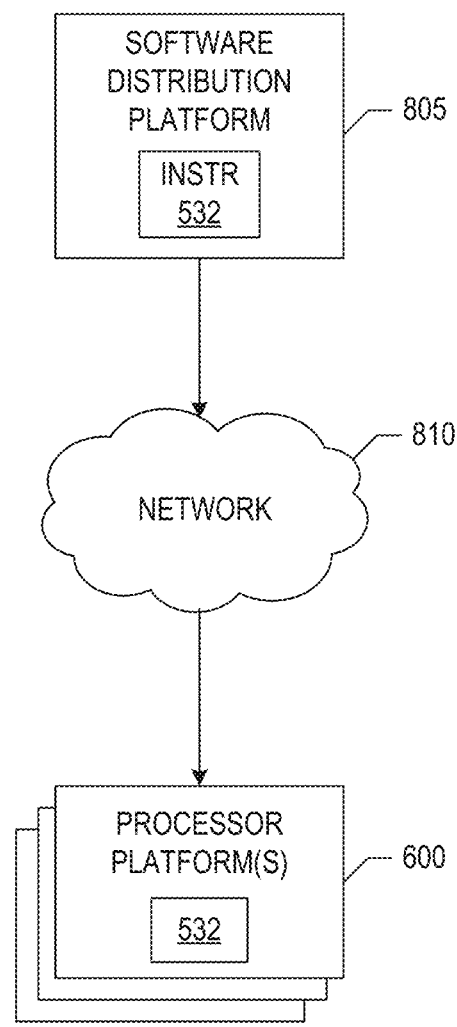
FIG. 8 is a block diagram of an example software distribution platform (e.g., one or more servers) to distribute software (e.g., software corresponding to the example machine readable instructions of FIGS. 3A-3B) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 805 to distribute software such as the example machine readable instructions 532 of FIG. 5 to hardware devices owned and/or operated by third parties is illustrated in FIG. 8. The example software distribution platform 805 may be implemented by any computer server, data facility, cloud service, etc., capable of storing and transmitting software to other computing devices. The third parties may be customers of the entity owning and/or operating the software distribution platform 805. For example, the entity that owns and/or operates the software distribution platform 805 may be a developer, a seller, and/or a licensor of software such as the example machine readable instructions 532 of FIG. 5. The third parties may be consumers, users, retailers, OEMs, etc., who purchase and/or license the software for use and/or re-sale and/or sublicensing. In the illustrated example, the software distribution platform 805 includes one or more servers and one or more storage devices. The storage devices store the machine readable instructions 532, which may correspond to the example machine readable instructions 300, 400, 500 of FIGS. 3-5, as described above. The one or more servers of the example software distribution platform 805 are in communication with a network 810, which may correspond to any one or more of the Internet and/or any example network. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 532 from the software distribution platform 805. For example, the software, which may correspond to the example machine readable instructions 300, 400, 500 of FIGS. 3A-4B, may be downloaded to the example processor platform 500, which is to execute the machine readable instructions 532 to implement the cloud management circuitry 106. In some examples, one or more servers of the software distribution platform 805 periodically offer, transmit, and/or force updates to the software (e.g., the example machine readable instructions 532 of FIG. 5) to ensure improvements, patches, updates, etc., are distributed and applied to the software at the end user devices.

From the foregoing, it will be appreciated that example systems, methods, apparatus, and articles of manufacture have been disclosed that manage resources when performing an account health check. Examples disclosed herein adjust health check polling frequencies for cloud accounts and/or suspend cloud accounts that have failed a threshold number of health checks, thereby conserving computing resources and time for other task. Accordingly, examples disclosed herein result in a more efficient health check protocol. Disclosed systems, methods, apparatus, and articles of manufacture are accordingly directed to one or more improvement(s) in the operation of a machine such as a computer or other electronic device.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   memory;
   computer readable instructions; and
   processor circuitry to execute the computer readable instructions to:
      perform health checks on a cloud account at a first polling frequency;
      after a failure count at the first polling frequency meets a first threshold, perform the health checks on the cloud account at a second polling frequency lower than the first polling frequency; and
      after the failure count at the second polling frequency meets a second threshold, suspend the cloud account.

2. The apparatus of claim 1, wherein the processor circuitry is to reset the failure count in response to a health check on the cloud account resulting in a successful health check.

3. The apparatus of claim 1, wherein the processor circuitry is to increment the failure count in response to a health check resulting in a failure.

4. The apparatus of claim 1, wherein the processor circuitry is to perform a health check by attempting to access the cloud account.

5. The apparatus of claim 1, wherein the processor circuitry is to prevent a health check on the cloud account when the cloud account is suspended.

6. The apparatus of claim 1, wherein the processor circuitry is to alert a health of the cloud account in response to a failure.

7. The apparatus of claim 1, wherein the processor circuitry is to store data related to the health checks.

8. A non-transitory computer readable medium comprising instructions which, when executed, cause one or more processors to at least:
   perform health checks on a cloud account at a first polling frequency;
   after a failure count at the first polling frequency meets a first threshold, perform the health checks on the cloud account at a second polling frequency lower than the first polling frequency; and
   after the failure count at the second polling frequency meets a second threshold, suspend the cloud account.

9. The computer readable medium of claim 8, wherein the instructions cause the one or more processors to reset the failure count in response to a health check on the cloud account resulting in a successful health check.

10. The computer readable medium of claim 8, wherein the instructions cause the one or more processors to the failure count in response to a health check resulting in a failure.

11. The computer readable medium of claim 8, wherein the instructions cause the one or more processors to perform a health check by attempting to access the cloud account.

12. The computer readable medium of claim 8, wherein the instructions cause the one or more processors to prevent a health check on the cloud account when the cloud account is suspended.

13. The computer readable medium of claim 8, wherein the instructions cause the one or more processors to alert a health of the cloud account in response to a failure.

14. The computer readable medium of claim 8, wherein the instructions cause the one or more processors to store data related to the health checks.

15. An apparatus comprising:
   interface circuitry to transmit an alert to a user; and
   processor circuitry including one or more of:
      at least one of a central processing unit, a graphics processing unit or a digital signal processor, the at least one of the central processing unit, the graphics processing unit or the digital signal processor having control circuitry, one or more registers, and arithmetic and logic circuitry to perform one or more first operations corresponding to instructions in the apparatus, and;
      a Field Programmable Gate Array (FPGA), the FPGA including logic gate circuitry, a plurality of configurable interconnections, and storage circuitry, the logic gate circuitry and interconnections to perform one or more second operations; or Application Specific Integrated Circuitry (ASIC) including logic gate circuitry to perform one or more third operations;

the processor circuitry to perform at least one of the first operations, the second operations or the third operations to instantiate:

health checking circuitry to:
perform health checks on a cloud account at a first polling frequency; and after a failure count at the first polling frequency meets a first threshold, perform the health checks on the cloud account at a second polling frequency lower than the first polling frequency; and cloud account tracking circuitry to, after the failure count at the second polling frequency meets a second threshold, suspend the cloud account.

16. The apparatus of claim 15, further including counter circuitry to reset the failure count in response to a health check on the cloud account resulting in a successful health check.

17. The apparatus of claim 15, further including counter circuitry to increment the failure count in response to a health check resulting in a failure.

18. The apparatus of claim 15, wherein the health checking circuitry is to perform a health check by attempting to access the cloud account.

19. The apparatus of claim 15, wherein the cloud account tracking circuitry is to prevent a health check on the cloud account when the cloud account is suspended.

20. The apparatus of claim 15, wherein the cloud account tracking circuitry is to alert a health of the cloud account in response to a failure.

21. The apparatus of claim 15, wherein the cloud account tracking circuitry is to store data related to the health checks in storage.

* * * * *